United States Patent Office 3,298,867
Patented Jan. 17, 1967

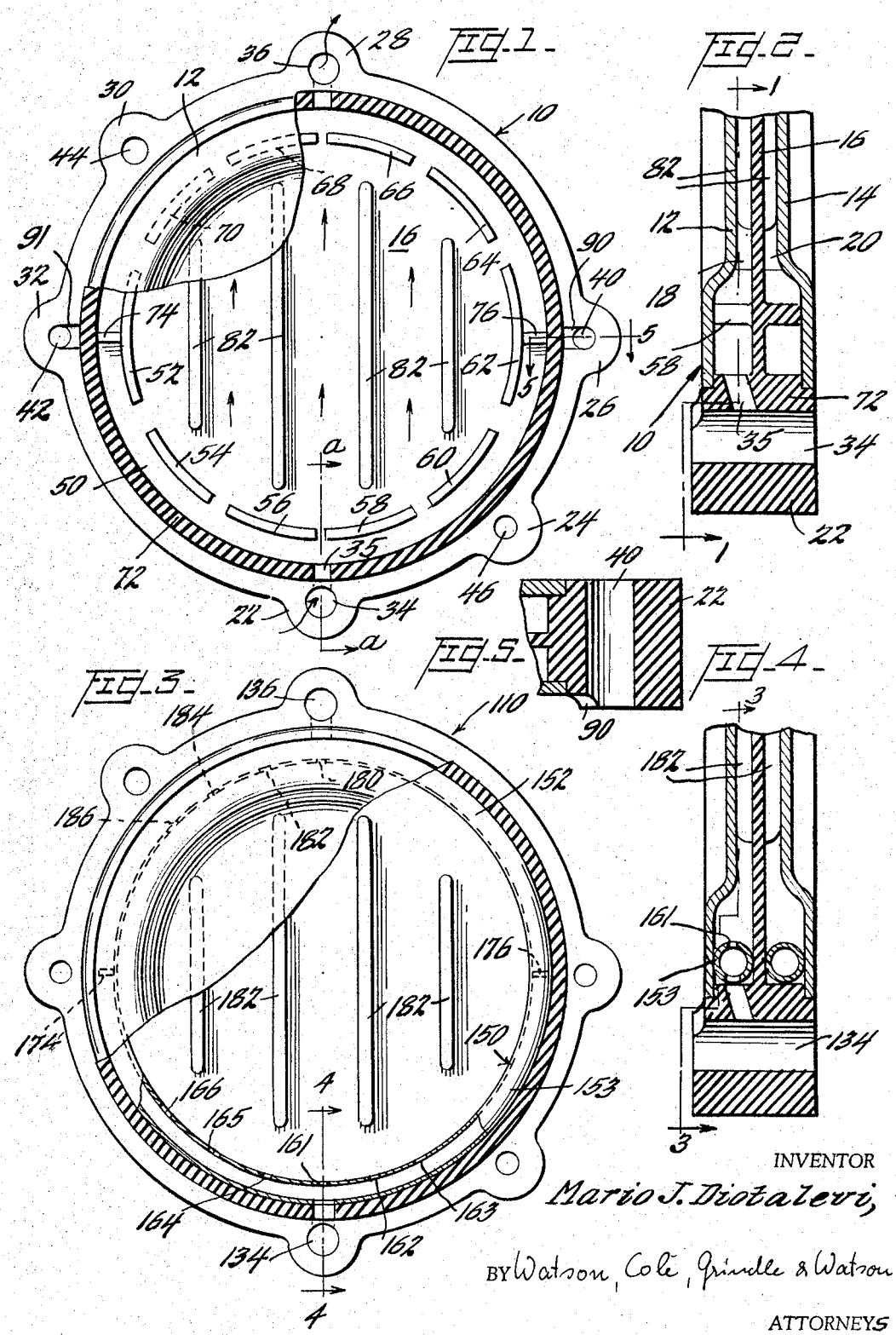

---

3,298,867
HYDROGEN DISTRIBUTION FUEL CELL
Mario J. Diotalevi, Somers, Conn., assignor, by mesne assignments, to Leesona Corporation, Cranston, R.I., a corporation of Massachusetts
Filed Dec. 31, 1962, Ser. No. 248,622
7 Claims. (Cl. 136—86)

This invention relates to a fuel cell and more particularly, to an improved fuel cell electrode assembly.

Fuel cell electrode assemblies are well known in the art in which gas passages for the fuel and oxidizing gases are conducted through the periphery of the electrodes and are then directed into the gas chambers between the electrodes by means of communicating ports. This form of gas distribution system exhibits certain disadvantages. For example, the gases are not evenly distributed to the surface of the electrodes and thus, the electrochemical reaction produced at the electrode interface is not uniform throughout the electrode area. This nonuniformity of reaction results in the development of lower electrical currents in certain areas than in others, namely those areas which receive lesser of the fuel or oxidizing gases as the case may be. The problem is more acute with respect to fuel gas than with respect to oxidizing gas.

Accordingly, it is an object of this invention to provide an improved fuel cell electrode assembly which obviates the above disadvantages.

It is a further object of this invention to provide an electrode assembly with an improved gas distributing system.

It is another object of this invention to provide an improved electrode assembly which includes a plurality of gas passages communicating with the peripheral gas port and with spaced points around the periphery of the electrode to provide uniform distribution of the gas to the electrode surface.

It is a still further object of this invention to provide in an electrode assembly means for distributing the gas to one surface of the electrode through a plurality of passages spaced around the periphery of the electrode and to provide a plurality of vanes or flow-directing members between these intake passages and the exhaust port for controlling the flow of the gas across the surface of the electrode to maintain uniformity of flow and therefore, produce uniformity of chemical reaction throughout the electrode interface.

It is a still further object of this invention to provide in a fuel cell assembly having intake and exhaust ports, a plurality of intake passages spaced around a portion of the periphery of the electrode and communicating with the intake port and a plurality of outlet passages around the remaining portion of the periphery of the electrode, which outlet passages communicate with the exhaust port and a plurality of flow-directing members intermediate the intake and exhaust passages, thereby maintaining uniformity of gas distribution across the surface of the electrode.

Briefly, in accordance with aspects of this invention, the electrode is mounted in a mount which supports the periphery of the electrode of the electrode and the combination of electrode and mount are so formed or provided with a channel around the periphery of the electrode. This channel is advantageously divided into sections, one section being an intake channel and communicating with the inlet port, while the other section communicates with the outlet gas port. Also advantageously, a plurality of communicating passages is provided between the channels and the active surface of the electrode. These channels have cross-sectional areas which increase with increasing distance from the respective ports. Thus, for decreasing gas pressure along the peripheral passage, the communicating passage area increases, thereby assuring uniformity as to the volume of gas passing through each of the passages and assuring a uniformity of the application of the gas to the active electrode surface.

Still further, the assembly is advantageously provided with a plurality of flow-directing members such as vanes or corrugations extending in the general direction between certain of the gas intake passages and the gas exhaust passages, thereby directing the flow of gas uniformly across one surface of the electrode.

In one illustrative embodiment, the peripheral gas passage is formed by a combination of the electrode mount and one peripheral surface of the electrode. This passage is provided with a plurality of ports which increase in cross-sectional area with the increasing distance from the respective port. The passage is provided with a pair of dams which prevent the direct flow from the intake port to the exhaust port through the passage. The remaining portion of the passage is employed for conducting the exhaust gases from the active surface area of the electrode to the exhaust port. Advantageously, these exhaust passages have a cross-sectional area which also increases with the distance from the exhaust passage to the exhaust port.

These and various other objects and features of the invention will be more clearly understood from a reading of the detailed description of the invention in conjunction with the drawing in which:

FIG. 1 is a plan view, partly in section along line 1—1 of FIG. 2, of an electrode assembly according to one illustrative embodiment of this invention;

FIG. 2 is a view in section taken along the line a—a of FIG. 1;

FIG. 3 is a view in plan, partly in section along line 3—3 of FIG. 4, of the other illustrative embodiment of this invention;

FIG. 4 is a view in section of the embodiment of FIG. 3 taken along the line 4—4; and, FIG. 5 is a sectional view taken along the line 5—5 of FIG. 1.

Referring now to FIGS. 1 and 2, there is shown in plan and section respectively, one illustrative embodiment of this invention. This includes a generally circular electrode mount 10 which supports a pair of electrodes 12 and 14. At the periphery of the surfaces of these electrodes, a divider 16 is provided between the electrodes to define a pair of gas chambers 18 and 20 adjacent electrodes 12 and 14, respectively. The mount 10 is provided with a plurality of lobes 22, 24, 26, 28, 30, and 32. The passage 34 through lobe 22 will be considered as the gas inlet passage, while the passage 36 through lobe 28 will be considered as the exhaust passage, although it will be understood by those skilled in the art that the flow of gas through these respective passages can be reversed without affecting the structure of the operation.

Between lobes 22, 28, 24, 30, 26, 32, suitable bolts (not shown), etc., are positioned for assembly and support of the module. Apertures 40 and 42 in lobes 26 and 32 respectively, might be employed to receive electrolyte through inlet passage 90 (shown in FIG. 5) and outlet 91 and passages 40 and 42 pass axially through a plurality of electrode assemblies in which electrolyte might be potassium hydroxide or some other suitable electrolyte which is usually a caustic at elevated temperatures. For example, it is well known in the art to maintain a temperature of the order of 400–450° F. in the electrolyte to increase the electrochemical acitvity of the cell and thereby increase the electrical power generation. Similarly, passages 44 and 46 might be employed as gas ports for the other gas which ports communicate with alternate gas chambers between electrodes and separators. In other words, if port 34 communicates with gas chamber 18 by means of passage 35, as best seen in FIG. 2, then port 46 would communicate with chamber 20 through a suitable passage, not shown. If gas port 34 carries the fuel gas, then port 46 should carry the oxidizing gas. Port 44 will, of course, communicate with the same gas chambers with which port 46 communicates, so that, for example, port 46 might be an inlet port for the oxidizing gas while port 44 will be the outlet port for the oxidizing gas.

The mount 10 of the embodiment of FIGS. 1 and 2 is provided with an annular groove or channel 50 which is defined beween a plurality of annular ridges 52, 54, 56, 58, 60, 62, 64, 66, 68 and 70. The other walls of the passage 50 are defined by the surface 72 of the mount 10 and the peripheral surface of the electrode 12, as best seen in FIG. 2. The resultant passage 50 is rectangular or square in cross section. It is understood, of course, that a circular cross section might be employed and one such circular cross section will be described in conjunction with the embodiment shown in FIGS. 3 and 4. Advantageously, the assembly is provided with a pair of dams 74 and 76 which separate the portions of the annular passage employed for inlet and outlet of the gases. The ridges are spaced around the periphery of the electrode to define slots or communicating gas passages between the peripheral passage 50 and the active area of the electrode 12. Advantageously, these passages or slots increase in diameter or cross-sectional area with increasing distance from the respective gas port to produce a uniformity of gas applied to the periphery of the electrode surface. Similarly, on the opposite portion of the periphery of the electrode, the ridges are spaced to define exhaust gas passages which communicate through the remaining portion 52 of the annular channel 50 which annular channel communicates with exhaust port 36. Intermediate the inlet passages defined in the ridges 52, 54, etc., and the outlet passages in ridges such as 68 and 70, there is provided a plurality of flow control or flow-directing members 82. These flow-directing members may be flat vanes extending from the separator 16 to contact the electrode 12 and these vanes extend the greater portion of the distance across the periphery of the electrode for the purpose of directing the gas uniformly across the active surface of the electrode from the inlet passages to the outlet passages.

Referring now to FIG. 3, there is shown another illustrative embodiment of this invention in which an electrode mount 110 is provided with an annular cylindrical pipe 150 which is divided into gas channels 152 and 153 by means of a pair of end walls 176 and 174. The portion 153 of the tube communicates with gas inlet port 134 while the portion 152 communicates with the exhaust port 136. A plurality of flow-directing members 182 extend in generally parallel direction between the inlet port 134 and the exhaust port 136 to direct the flow of gas between these ports. This gas issues from a plurality of holes or passages 161, 162, 163, 164, 165, and 166. Advantageously, the diameter of these holes increases with the distance from the intake port 134. In one illustrative embodiment, these holes ranged in diameter from .030 to .060 inch. It is understood, however, that the actual size of the holes or passages is a function of the load as well as the overall size of the fuel cell electrode. The portion 152 of the peripheral tube 150 is provided with passages 180, 182, 184 and 186. These passages also have increasing cross-sectional area with the increasing distance from the exhaust port 136.

Although we have described this gas distribution arrangement for a fuel cell assembly in conjunction with only one electrode of a pair of electrodes, such as a bipolar assembly, it is understood that the identical arrangement of peripheral passages and gas ports might be employed with each electrode of the bipolar group or each electrode of the entire fuel cell.

While we have shown and described two illustrative embodiments of this invention, it is understood that the concepts thereof might be applied to other embodiments without departing from the spirit and scope of this invention.

What is claimed is:

1. In a fuel cell, an electrode assembly comprising a mount including a gas separator, an electrode on said mount; said mount, separator and electrode defining a gas chamber behind said electrode, means for supplying a gas around the periphery of said electrode and to said chamber including an intake port and a gas channel extending around one portion of the periphery of the electrode, said gas channel having a plurality of gas passages therein communicating with said gas chamber, and having flow-directing means within said chamber to direct the flow of gas in substantially the same direction, said assembly further comprising an exhaust port, an exhaust gas channel extending around a portion of the periphery of the electrode and communicating with said exhaust port and exhaust passage means communicating with said exhaust channel and said chamber.

2. The combination according to claim 1, wherein said electrode mount is circular and said electrode is circular and wherein said flow-directing means comprises a plurality of ridges on said separator, which ridges contact said electrode.

3. The combination according to claim 1, wherein said channels are defined by a plurality of ridges on said mount, which ridges are spaced to define gas communicating passages between said channel and said chamber.

4. The combination according to claim 3, including dam means in said channels to separate the inlet gas channel from the outlet gas channel.

5. The combination according to claim 1, wherein said electrode is circular and wherein said means for supplying gas to said electrode includes a circular tube mounted on said mount adjacent said mount and said electrode, said tube having a passage communicating with said inlet port and a plurality of gas passages in said tube communicating with said chamber.

6. The combination according to claim 5, wherein said circular tube includes a second section communicating with said exhaust port, said second section having a plurality of communicating gas passages therein, said last mentioned communicating passages having cross-sectional areas which increase with the distance from said exhaust port.

7. The combination according to claim 6, wherein said flow-directing means comprises a plurality of corrugations between said separator and said electrode which corrugations extend in a direction generally parallel to a line connecting said inlet and said exhaust ports.

References Cited by the Examiner
UNITED STATES PATENTS
3,146,131   8/1964   Linden et al. _____ 136—86

WINSTON A. DOUGLAS, *Primary Examiner.*

ALLEN B. CURTIS, *Examiner.*